United States Patent
Asai et al.

(10) Patent No.: US 6,344,988 B2
(45) Date of Patent: Feb. 5, 2002

(54) POWER UNIT

(75) Inventors: Koichi Asai, Tokyo; Motohiro Shimizu, Saitama-ken; Hiroyuki Eguchi, Tokyo, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,544

(22) Filed: Jan. 29, 2001

(30) Foreign Application Priority Data

Feb. 1, 2000 (JP) ........................................ 2000-024412

(51) Int. Cl.$^7$ ................................................ H02M 5/00
(52) U.S. Cl. ........................ 363/149; 363/65; 363/161
(58) Field of Search ................................ 363/10, 65, 96, 363/98, 136, 149, 160, 161

(56) References Cited

U.S. PATENT DOCUMENTS 5,886,893 A * 3/1999 Asai et al. .................. 363/161
5,943,221 A * 8/1999 Asai et al. .................... 363/10

FOREIGN PATENT DOCUMENTS

| JP | 04-355672 A | 12/1992 |
| JP | 7-67229 | 7/1995 |

* cited by examiner

*Primary Examiner*—Peter S. Wong
*Assistant Examiner*—Gary L. Laxton
(74) *Attorney, Agent, or Firm*—Frishauf, Holtz, Goodman, Langer & Chick, P.C.

(57) ABSTRACT

A power unit is provided which can perform stable feedback control by reducing a feedback gain, and sufficiently cope with fluctuations in the output voltage occurring according to fluctuations in the input voltage caused by fluctuations in the rotational speed of an engine. A pair of variable control bridge circuits are connected to three-phase output windings of a three-phase generator driven by the engine, and connected in an antiparallel manner to each other to form a cycloconverter for generating a single-phase alternating current to be supplied to a load. A voltage-detecting circuit detects a voltage of the three-phase alternating current. An effective voltage value-calculating circuit calculates an effective value of the voltage of the alternating current. A reference sinusoidal waveform-forming circuit generates a voltage of a reference waveform for controlling the single-phase alternating current. A reference effective voltage value-generating circuit generates a reference effective voltage for controlling the single-phase alternating current. A firing angle control device controls the pair of variable control bridge circuits such that the pair of variable control bridge circuits alternately switch to operate every half a repetition period of the single-phase alternating current, so as to make the effective value of the voltage of the single-phase alternating current closer to a value of the reference effective voltage, and at the same time, make the voltage of the single-phase alternating current closer to the voltage having the reference waveform.

5 Claims, 8 Drawing Sheets

α=120°

α=120°

α=60°

α=60°

POWER UNIT

BACKGROUND OF THE INVENTION

1. Field of the Invention

This invention relates to a power unit which generates a single-phase AC power having a commercial frequency or a like frequency.

2. Prior Art

Conventionally, a power unit which is a combination of a small-sized engine and a synchronous generator, for instance, is widely used for emergency purposes, outdoor works, leisure time amusement, etc.

In this type of conventional power unit, however, the output frequency depends on the rotational speed of the engine. Therefore, in the case of a bipolar generator, to obtain an AC output of 50 Hz (or 60 Hz), the rotational speed of the engine is required to be held at 3000 rpm (or 3600 rpm), i.e. a relatively low rotational speed, which degrades the operating efficiency of the power unit, and further, necessitates designing the generator to be large in size, resulting in an increased total weight of the power unit.

To overcome this inconvenience, a so-called inverter generator has been proposed by the present assignee, e.g. in Japanese Patent Publication (Kokoku) No. 7-67229 and Japanese Laid-Open Patent Publication (Kokai) No. 4-355672, which is constructed such that the engine is operated at a relatively high rotational speed to obtain a high AC power from the generator, the AC power is once converted to direct current, and then the direct current is converted to alternating current having a commercial frequency by an inverter.

The conventional inverter generator, however, requires provision of two power conversion blocks, i.e. an AC-to-DC conversion block for once converting the AC power to DC power, and a DC-to-AC conversion block for converting the DC power to AC power having a predetermined frequency, as well as a circuit for temporarily storing the DC power. Thus, the use of a lot of expensive power circuit components is necessitated. This makes it difficult to reduce the size of the generator and leads to an increased manufacturing cost.

As a solution to this problem, a so-called cycloconverter generator has become commercially available, in which a cycloconverter is employed for use with the generator to directly convert the high AC power generated by the generator (the generator is operated at a relatively high engine rotational speed, and hence the frequency of the alternating current generating the AC power is higher than a commercial frequency) to AC power having the predetermined commercial frequency, without carrying out AC-to-DC conversion.

In the conventional cycloconverter generator, however, since the AC power generated by the generator is directly converted to the AC power having the predetermined frequency (commercial frequency), without being once converted to direct current, as described above, to promptly reduce an undue fluctuation in the output voltage caused by a rapid change in the input voltage which inevitably occurs when a generator having a relatively small capacity is used, or more specifically, an undue fluctuation in the output voltage occurring when the power unit is switched between a no-loaded condition thereof and a loaded condition thereof, in short, to reduce an output voltage regulation, a very large feedback gain is required of the power unit.

Therefore, when a conventional control method, or more specifically, a control method of reducing the output voltage regulation simply by feedback of the waveform of the output voltage is applied to the above conventional cycloconverter generator, a very large feedback gain is required, as mentioned above, which makes it difficult to achieve stable control of the generator.

A possible solution to this problem is to modify the cycloconverter generator such that the effective value of the output voltage is detected over a predetermined number of repetition periods of the output voltage and feedback control is carried out based on the detected effective voltage value, thereby reducing the feedback gain to enable the generator to perform more stable feedback control.

The cycloconverter generator modified as above can sufficiently cope with a fluctuation in the output voltage caused by a rapid change in the input voltage occurring when the power unit is switched between a no-loaded condition thereof and a loaded condition thereof. However, the AC power is generated from a generator driven by an engine operating with a relatively high rotational speed which is changing, and such AC power is directly converted to AC power having a predetermined frequency (commercial frequency), without being converted to direct current. Therefore, it is impossible for the generator to sufficiently cope with fluctuations in the output voltage occurring according to fluctuations in the input voltage ascribable to fluctuations in the engine rotational speed. This inconvenience cannot be eliminated even if the effective value of the output voltage is detected by limiting the number of repetition periods of the output voltage to one, because a time period taken for detection of an effective value of the output voltage per repetition period thereof is considerably longer than a time period over which a change in the input voltage takes place according to a change in the engine rotational speed. More specifically, assuming that a single-cylinder four-cycle engine is rotated at 3600 rpm to drive the generator, and a rated load is connected to the power unit, the engine rotational speed varies to an extent of approximately ±150 rpm from 3600 rpm during an explosion stroke of the engine. This variation (fluctuation) takes place over a time period of approximately 5 msec. On the other hand, assuming that the frequency of the AC output of the cycloconverter generator is a commercial frequency, i.e. 50 Hz, a time period taken for the detection of an effective value of the output voltage per repetition period thereof is 20 msec. This means that when a factor has been detected to carry out effective feedback control based thereon, a change in the engine rotational speed responsible for the factor, which is to be controlled, has already ended, and hence even the method based on detection of the effective value of the output voltage per repetition period cannot enable the power unit to sufficiently cope with fluctuations in the output voltage occurring according to fluctuations in the input voltage caused by fluctuations in the engine rotational speed.

SUMMARY OF THE INVENTION

It is an object of the present invention to provide a power unit which is capable of performing stable feedback control by reducing a feedback gain, and at the same time, sufficiently coping with fluctuations in the output voltage occurring according to fluctuations in the input voltage caused by fluctuations in the rotational speed of an engine as a drive source of the power unit.

To attain the above object, the present invention provides a power unit comprising:

a three-phase generator having a three-phase output windings;

a pair of variable control bridge circuits connected to the three-phase output windings of the three-phase generator and connected in an antiparallel manner to each other to form a cycloconverter for generating a single-phase alternating current to be supplied to a load;

voltage-detecting means for detecting a voltage of the single-phase alternating current generated by the pair of variable control bridge circuits;

effective voltage value-detecting means for detecting an effective value of the voltage of the single-phase alternating current;

reference waveform voltage-generating means for generating a voltage having a reference waveform for controlling the single-phase alternating current;

reference effective voltage-generating means for generating a reference effective voltage for controlling the single-phase alternating current; and control means for controlling the pair of variable control bridge circuits such that the pair of variable control bridge circuits alternately switch to operate every half a repetition period of the single-phase alternating current, so as to make the effective value of the voltage of the single-phase alternating current detected by the effective voltage value-detecting means closer to a value of the reference effective voltage generated by the reference effective voltage-generating means, and at the same time, make the voltage of the single-phase alternating current detected by the voltage-detecting means closer to the voltage having the reference waveform, which is generated by the reference waveform voltage-generating means.

Preferably, the effective voltage value-detecting means detects the effective value over a predetermined number of repetition periods of the voltage of the single-phase alternating current.

More preferably, the predetermined number of repetition periods of the voltage of the single-phase alternating current is one repetition period.

Preferably, the three-phase generator is a magneto generator having a permanent magnet rotor.

The above and other objects, features, and advantages of the invention will become more apparent from the following detailed description taken in conjunction with the accompanying drawings.

DETAILED DESCRIPTION OF PREFERRED EMBODIMENT

Next, the present invention will be described with reference to drawings showing an embodiment thereof.

Figure 1:
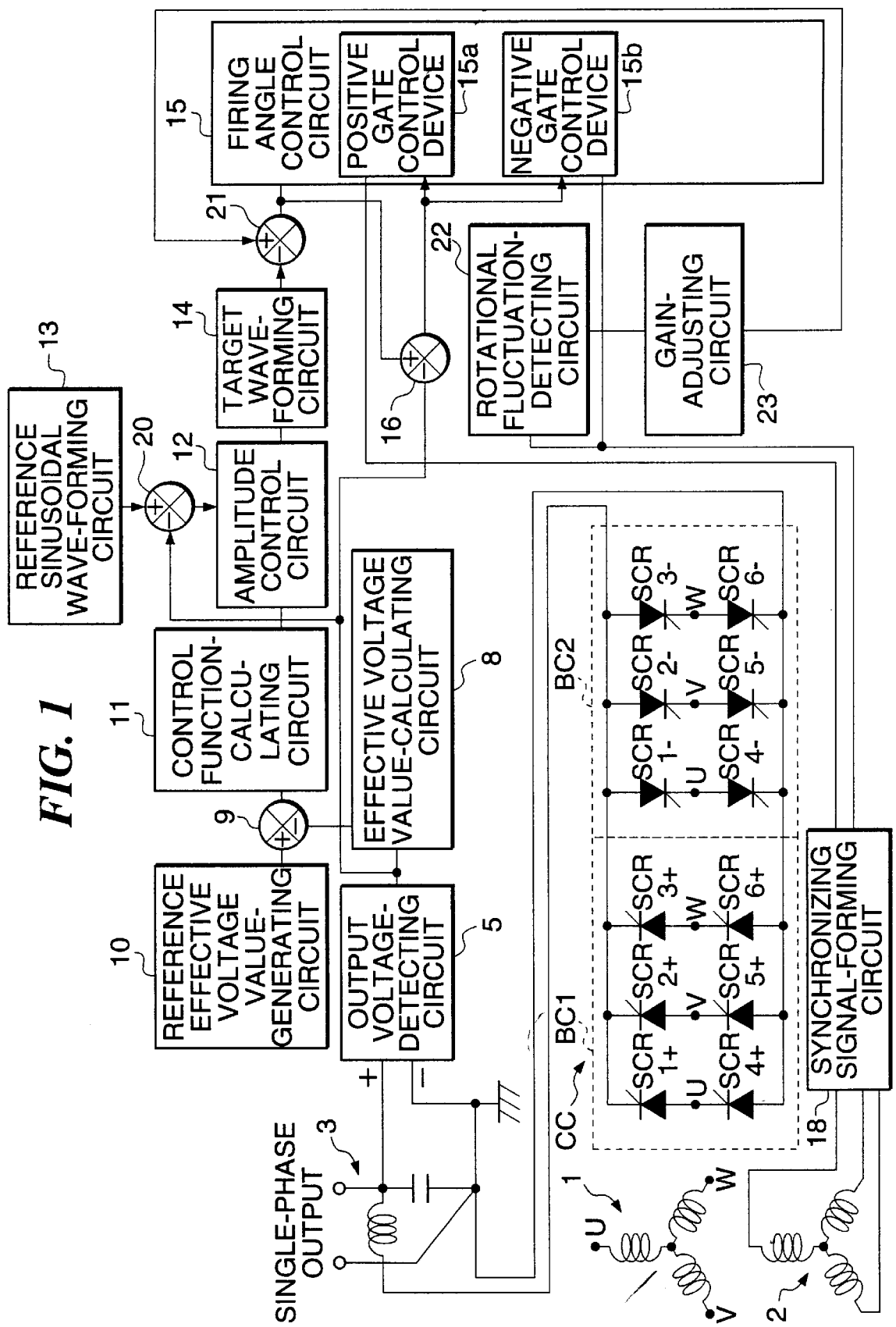
FIG. 1 is a block diagram schematically showing the whole arrangement of a power unit according to an embodiment of the present invention.

FIG. 1 shows the whole arrangement of a power unit according to an embodiment of the present invention.

In the figure, reference numerals 1 and 2 designate output windings independently wound around a stator of an AC generator, i.e. reference numeral 1 designates a three-phase main output winding (hereinafter referred to as the "three-phase main coil"), and reference numeral 2 designates a three-phase auxiliary output winding (hereinafter referred to as the "three-phase sub coil"), respectively.

Figure 2A:
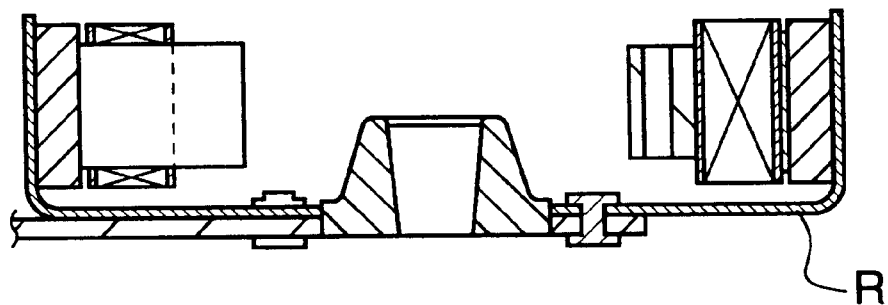
FIG. 2A is a traverse cross-sectional view of an AC generator appearing in FIG. 1.
Figure 2B:
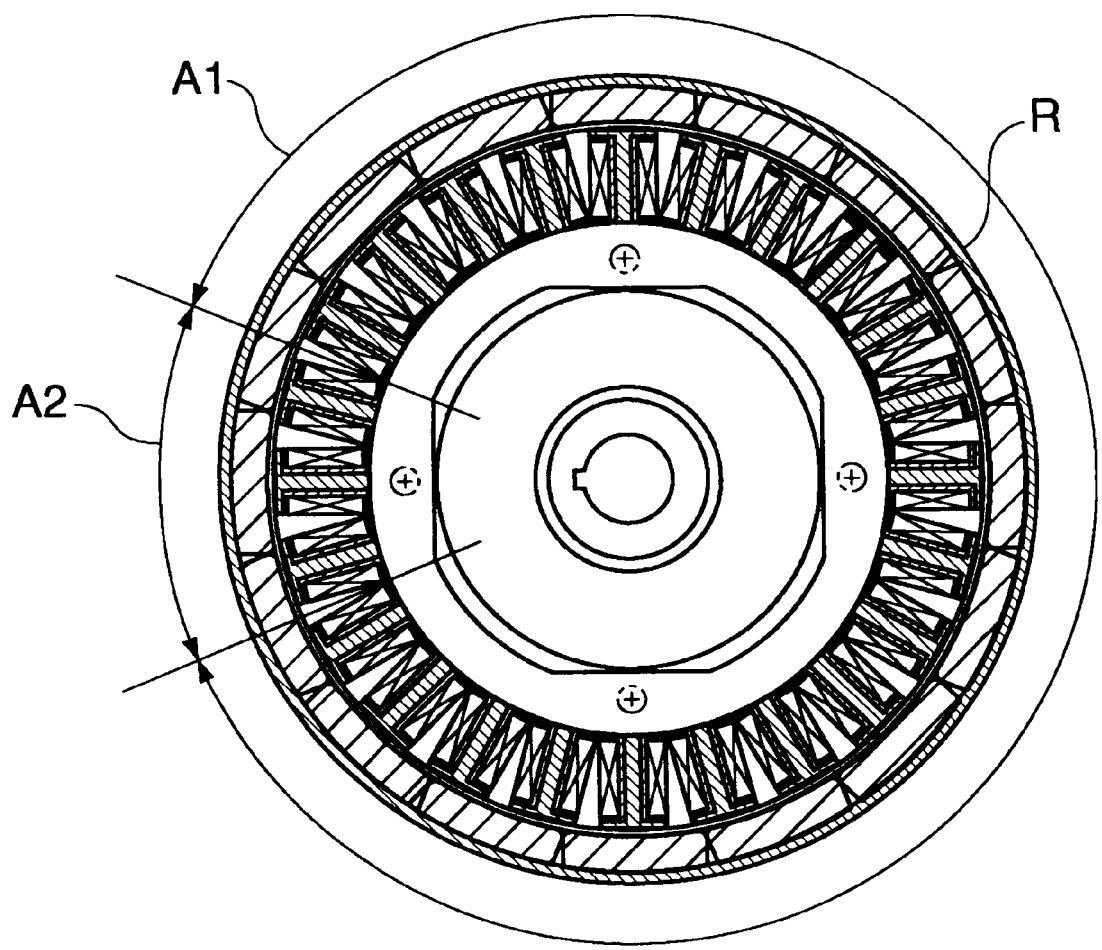
FIG. 2B is a longitudinal cross-sectional view of the AC generator.

FIGS. 2A and 2B show the construction of the AC generator in longitudinal cross-section and transverse cross-section, respectively. The three-phase main coil 1 is formed of coils forming twenty-one poles within an area A1, and the three-phase sub coil 2 is formed of coils forming three poles within an area A2. A rotor R is formed with eight pairs of magnetic poles of permanent magnets, and driven for rotation by an internal combustion engine, not shown. The rotor R also serves as a flywheel of the engine.

Referring again to FIG. 1, the three-phase main coil 1 has three output terminals U, V, and W which are connected to respective input terminals U, V and W of each of positive and negative converters BC1 and BC2 of a cycloconverter CC.

Figure 3:
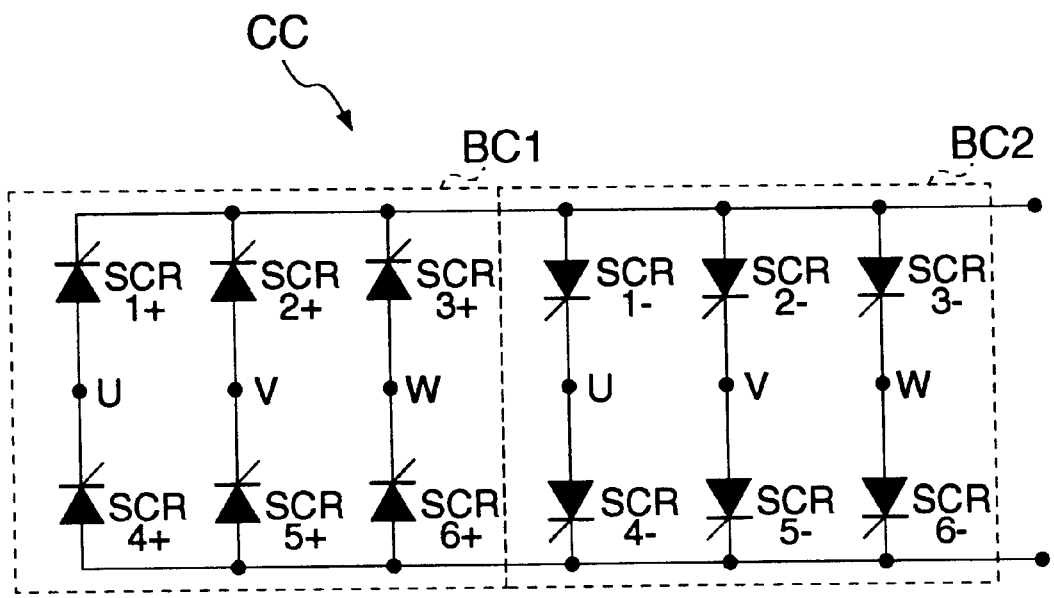
FIG. 3 is a circuit diagram showing the construction of a cycloconverter appearing in FIG. 1.

FIG. 3 shows the construction of the cycloconverter CC appearing in FIG. 1. As shown in the figure, the cycloconverter CC is comprised of twelve thyristors SCRk±(k=1, 2, . . . , 6), with six thyristors SCRk+ thereof forming a bridge circuit (hereinafter referred to as "the positive converter") BC1 for delivering positive electric current, and the remaining six thyristors SCRk− thereof forming another bridge circuit (hereinafter referred to as "the negative converter") BC2 for delivering negative electric current.

When the three-phase generator with twenty-four poles (three of them are used to generate synchronizing signals for control of respective gates of the thyristors SCRK±) connected to the cycloconverter CC is driven by the engine, eight cycles of three-phase alternating current are supplied to the cycloconverter CC per one revolution of the crankshaft of the engine. If the rotational speed of the engine is set to a range of 1200 rpm to 4500 rpm (equivalent to a frequency range of 20 Hz to 75 Hz), the frequency of the three-phase AC output from the generator is 160 Hz to 600 Hz, eight times as high as the rotational speed of the engine.

Referring again to FIG. 1, the three output terminals U, V, and W of the three-phase main coil 1 are connected to the respective input terminals U, V and W of each of the positive and negative converters BC1 and BC2 of the cycloconverter CC, as mentioned above. The output side of the cycloconverter CC is connected to an LC filter 3 for removing harmonic components of output current from the cycloconverter CC. The output side of the LC filter 3 is connected to an output voltage-detecting circuit 5 for detecting a voltage of the output current with the harmonic components removed, delivered from the LC filter 3. The output voltage-detecting circuit 5 has a positive input terminal thereof connected to the LC filter 3 and a negative input terminal thereof connected to a ground GND of the control system of the power unit whereby a single-phase output is obtained from the positive and negative input terminals of the output voltage-detecting circuit 5.

The output voltage-detecting circuit 5 has an output side thereof connected to an effective voltage value-calculating circuit 8 for calculating an effective value per repetition period of the output voltage from the circuit 5. The circuit 8 has an output side thereof connected to a negative input terminal of a comparator 9. Connected to a positive input terminal of the comparator 9 is a reference effective voltage value-generating circuit 10 for generating an effective value of a reference voltage to be generated by the power unit (reference effective voltage value). The comparator 9 has an output side thereof connected to a control function-calculating circuit 11 which calculates a control function, such as a linear function, based on results of the comparison by the comparator 9.

The control function-calculating circuit 11 has an output side thereof connected to one input side of an amplitude control circuit 12 which controls the amplitude of a target wave output from a target wave-forming circuit 14. The amplitude control circuit 12 has the other input side thereof connected to the output side of a comparator 20 which delivers the difference (or a value corresponding to the difference) between a sinusoidal wave having e.g. a commercial frequency of 50 Hz or 60 Hz delivered from a reference sinusoidal wave-forming circuit 13 and the output voltage detected by the output voltage-detecting circuit 5. The amplitude control circuit 12 delivers an amplitude control signal for controlling the amplitude of the target wave in response to the control function delivered from the control function-calculating circuit 11 and the difference delivered from the comparator 20.

The amplitude control circuit 12 has an output side thereof connected to the target wave-forming circuit 14 which generates a target wave in response to the amplitude control signal from the circuit 12. The target wave-forming circuit 14 has an output side thereof connected to a firing angle control device 15 for controlling the firing angle of a gate of each of the thyristors SCRk± constituting the cycloconverter CC, as well as to a positive input terminal of a comparator 16.

The firing angle control device 15 is comprised of a positive gate control device 15a for controlling the firing angles of gates of the thyristors SCRk+ of the positive converter BC1 (hereinafter referred to as "the positive gates") and a negative gate control device 15b for controlling the firing angles of gates of the thyristors SCRk− of the negative converter BC2 (hereinafter referred to as "the negative gates").

The positive and negative gate control devices 15a, 15b each have six comparators, not shown, each of which compares the target wave with a synchronizing signal (reference sawtooth wave), referred to hereinafter, and fires a corresponding gate when the two waves agree with each other The comparator 16 has a negative input terminal thereof connected to the output side of the output voltage-detecting circuit 5 and an output terminal thereof connected to the positive gate control device 15a and the negative gate control device 15b. The comparator 16 compares the voltage delivered from the output voltage-detecting circuit 5 with the target wave, and selectively delivers a high (H) level signal and a low (L) level signal depending upon results of the comparison.

When the H level signal is delivered from the comparator 16, the positive gate control device 15a is enabled while the negative gate control device 15b is disabled. On the other hand, when the L level signal is delivered from the same, the positive gate control device 15a is disabled while the negative gate control device 15b is enabled.

The output sides of the three-phase sub coils 2 are connected to the synchronizing signal-forming circuit 18.

Figure 4:
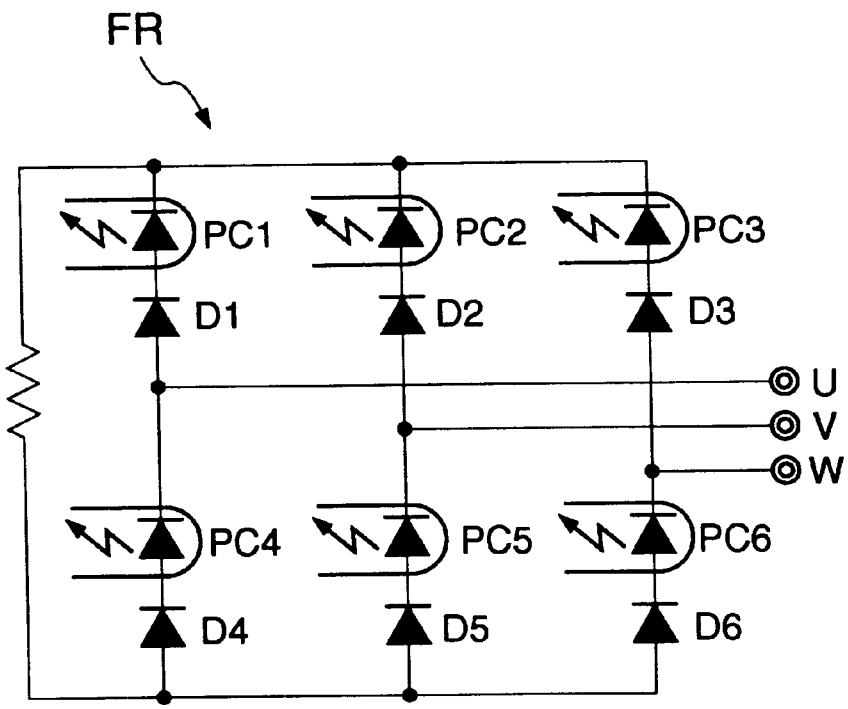
FIG. 4 is a circuit diagram showing an example of a synchronizing signal-forming circuit 18.

FIG. 4 shows the construction of the synchronizing signal-forming circuit 18. As shown in the figure, the circuit 18 is formed of six photocouplers PCk (k=1, 2, . . . , 6) and six diodes Dk (k=1, 2, . . . , 6).

Components of the three-phase alternating current (i.e. U-phase current, V-phase current, and W-phase current) obtained from the three-phase sub coil 2 are supplied to a three-phase full-wave bridge rectifier FR formed by primary light-emitting diodes (LED's) of the respective six photocouplers PCk and the six diodes Dk. Direct current components of the three-phase alternating current full-wave rectified by the three-phase full-wave rectifier FR are transformed into light by the primary light-emitting diodes, and then the light is converted into electric current by secondary photosensors, not shown, associated with the primary light-emitting diodes of the photocouplers PCk. In short, electric current corresponding to the three-phase alternating current full-wave rectified by the three-phase full-wave rectifier FR is delivered from the secondary photosensors of the photocouplers. The electric currents are used to form a synchronizing signal having e.g. a sawtooth waveform for controlling a phase control angle (firing angle) α of a gate of each of the thyristors SCRk±, as described in detail hereinafter.

Figure 5:
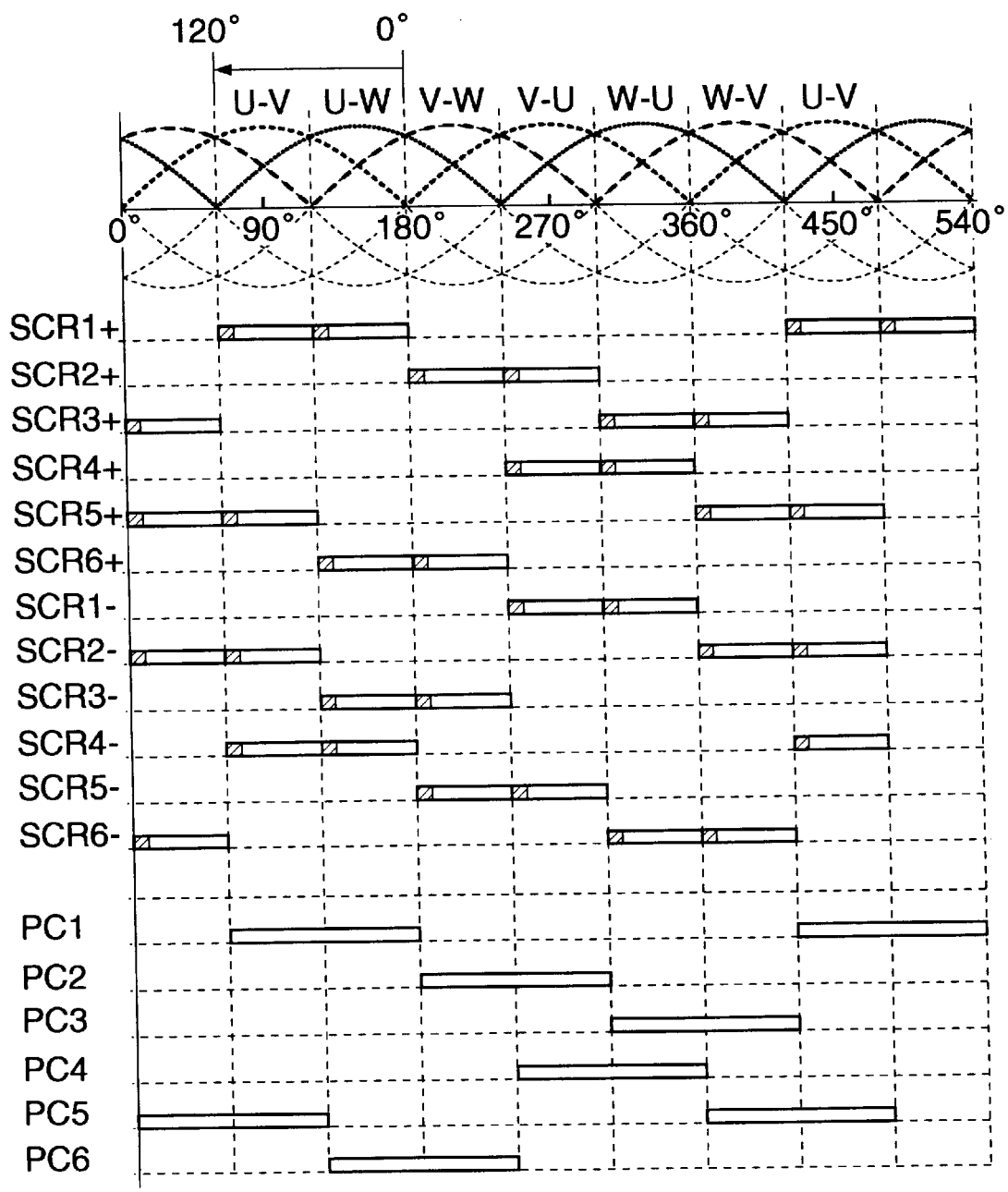
FIG. 5 is a timing chart showing changes in voltages applied between a U phase, a V phase, and a W phase, each appearing in FIGS. 6A to 6D or 7, timing of turn-on of photocouplers, and timing of turn-on of gates of thyristors.

FIG. 5 shows changes in line-to-line voltages applied between respective pairs of the U, V, and W phases of the three-phase AC power shown in FIG. 3 or 4 and timing of "turn-on" of the photocouplers PCk.

Assuming that the line-to-line voltages (U-V, U-W, V-W, V-U, W-U, and W-V) change as shown in FIG. 5, the waveform of a full-wave rectified output from the three-phase full-wave rectifier FR has a repetition period of one sixth of that of the waveform of each line-to-line voltage obtained from the main coil. For example, when the U-V voltage is in a phase angle range of 60° to 120° where the U-V voltage is the highest of all the line-to-line voltages, the photocouplers PC1 and PC5 are turned on in pair (the other photocouplers are held off), whereby the three-phase full-wave rectifier circuit FR delivers electric current at a voltage corresponding to the U-V voltage. That is, the three-phase full-wave rectifier FR delivers electric current at a voltage corresponding to the maximum value of all the line-to-line voltages, so that the repetition period of the output voltage corresponds to a phase angle of 60°, and hence is equal to one sixth of the repetition period of the three-phase output voltage of the main coil, which corresponds to a phase angle of 360°.

FIG. 5 also shows a controllable range of timing of firing (turn-on) of the gate of each of the thyristors SCRk±, which is set to a phase angle range of 120° to 0° of a corresponding line-to-line voltage with two examples of timing of firing of each gate which are indicated by hatched portions (i.e. firing angles of 120° and 60° described hereinafter.

According to this timing, each gate of the positive converter BC1 is fired (turned on) to deliver electric current therefrom, and each gate of the negative converter BC2 is turned on to absorb electric current thereto.

Needless to say, the gates are not required to be continuously held on over a selected portion of the controllable range, but the application of a predetermined pulse at timing indicated by the hatched portion (e.g. corresponding to one of the firing angles of 120° and 60°, enables the same operation as above to be performed.

FIGS. 6A to 6D show examples of waveforms of the output of the cycloconverter obtained when the thyristors SCRk± of the positive and negative converters BC1 and BC2 are fired at respective firing angles of 120° and 60°.

Figure 6A:
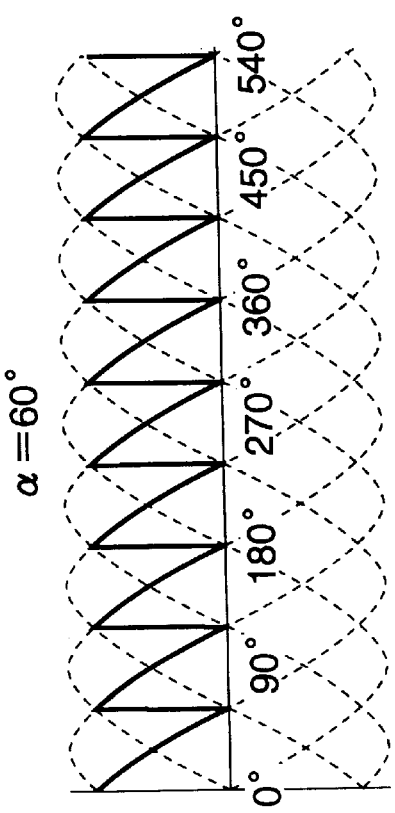
FIG. 6A is a diagram showing an output waveform of a positive converter exhibited when each thyristor thereof is fired at a firing angle of 120 degrees.
Figure 6B:
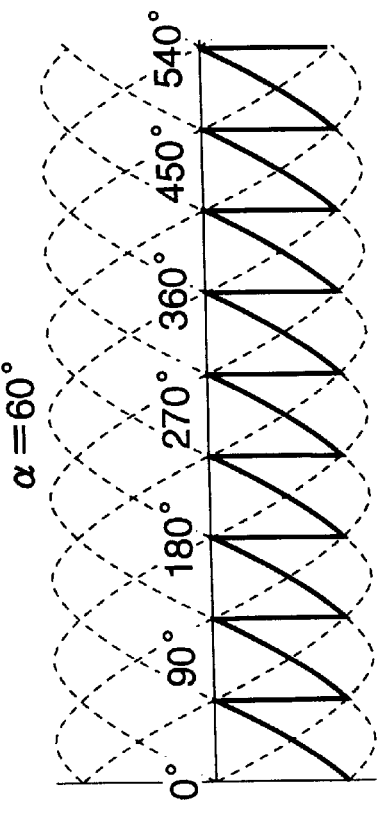
FIG. 6B is a diagram showing an output waveform of a negative converter exhibited when each thyristor thereof is fired at a firing angle of 120 degrees.
Figure 6C:
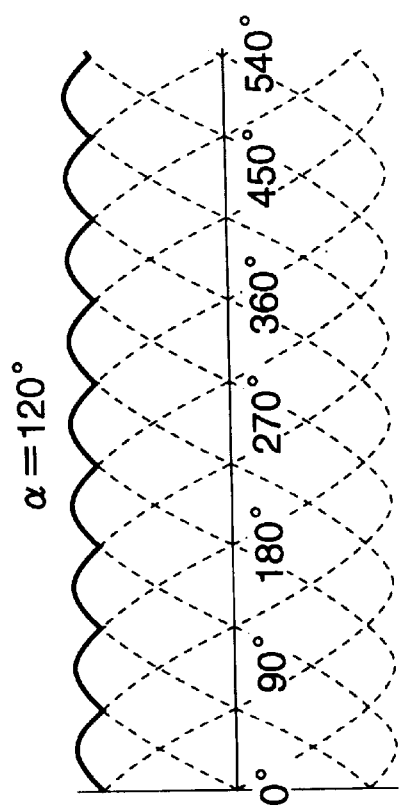
FIG. 6C is a diagram showing an output waveform of the positive converter exhibited when each thyristor thereof is fired at a firing angle of 60 degrees.
Figure 6D:
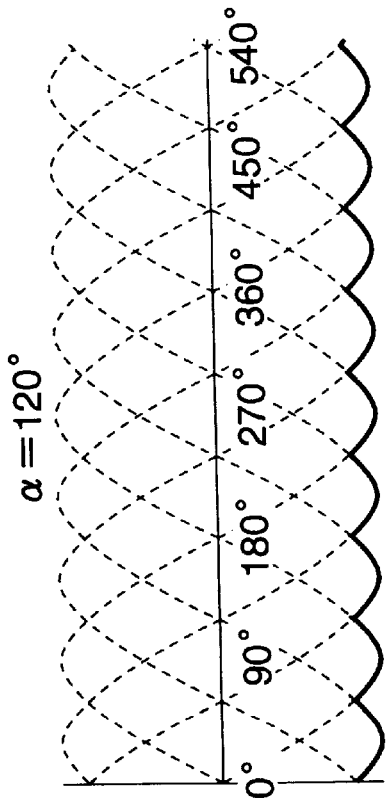
FIG. 6D is a diagram showing an output waveform of the negative converter exhibited when each thyristor thereof is fired at a firing angle of 60 degrees.

FIG. 6A shows an output waveform of the cycloconverter CC obtained when each thyristor SCRk+ of the positive converter BC1 is turned on at a firing angle α of 120°, and FIG. 6B an output waveform of the same obtained when each thyristor SCRk− of the negative converter BC2 is turned on at a firing angle α of 120°. On the other hand, FIG. 6C shows an output waveform of the same obtained when each thyristor SCRk+ of the positive converter BC1 is turned on at a firing angle α of 60°, and FIG. 6D an output waveform of the cycloconverter CC obtained when each thyristor SCRk− of the negative converter BC2 is turned on at a firing angle α of 60°.

When each thyristor SCRk+ of the positive converter BC1 is turned on at the firing angle α of 120°, the output waveform of the cycloconverter CC presents a full-wave rectified current waveform as shown in FIG. 6A. When each thyristor SCRk+ of the positive converter BC1 is turned on at a firing angle α of 60°, the output waveform contains a lot of harmonic components as shown in FIG. 6C. These harmonic components, however, can be removed by a low-pass filter connected to the output side of the cycloconverter CC, so that electric current is output at an averaged voltage. As described hereinabove, assuming that the power supply to the cycloconverter is a three-phase generator having twenty-four poles, and the rotational speed of the engine is set to 3600 rpm, the frequency of a basic wave of the harmonic components is given by the following equation:

60 Hz (=3600 rpm)×8(-th harmonic)×3(phases)×2(half waves)(=1 full wave)=2.88 kHz Further, by varying the firing angle α of each thyristor of the positive converter BC1 within a range of 0° to 120°, the cycloconverter CC is capable of generating a positive voltage as desired which has an average voltage within a range of 0 V to a positive full-wave rectified voltage. By varying the firing angle α of each thyristor of the negative converter BC2 in the same manner, the cycloconverter CC is capable of generating a negative voltage as desired which has an average voltage within a range of 0 V to a negative full-wave rectified voltage.

Next, the manner of controlling the firing angle α will be described.

Figure 7:
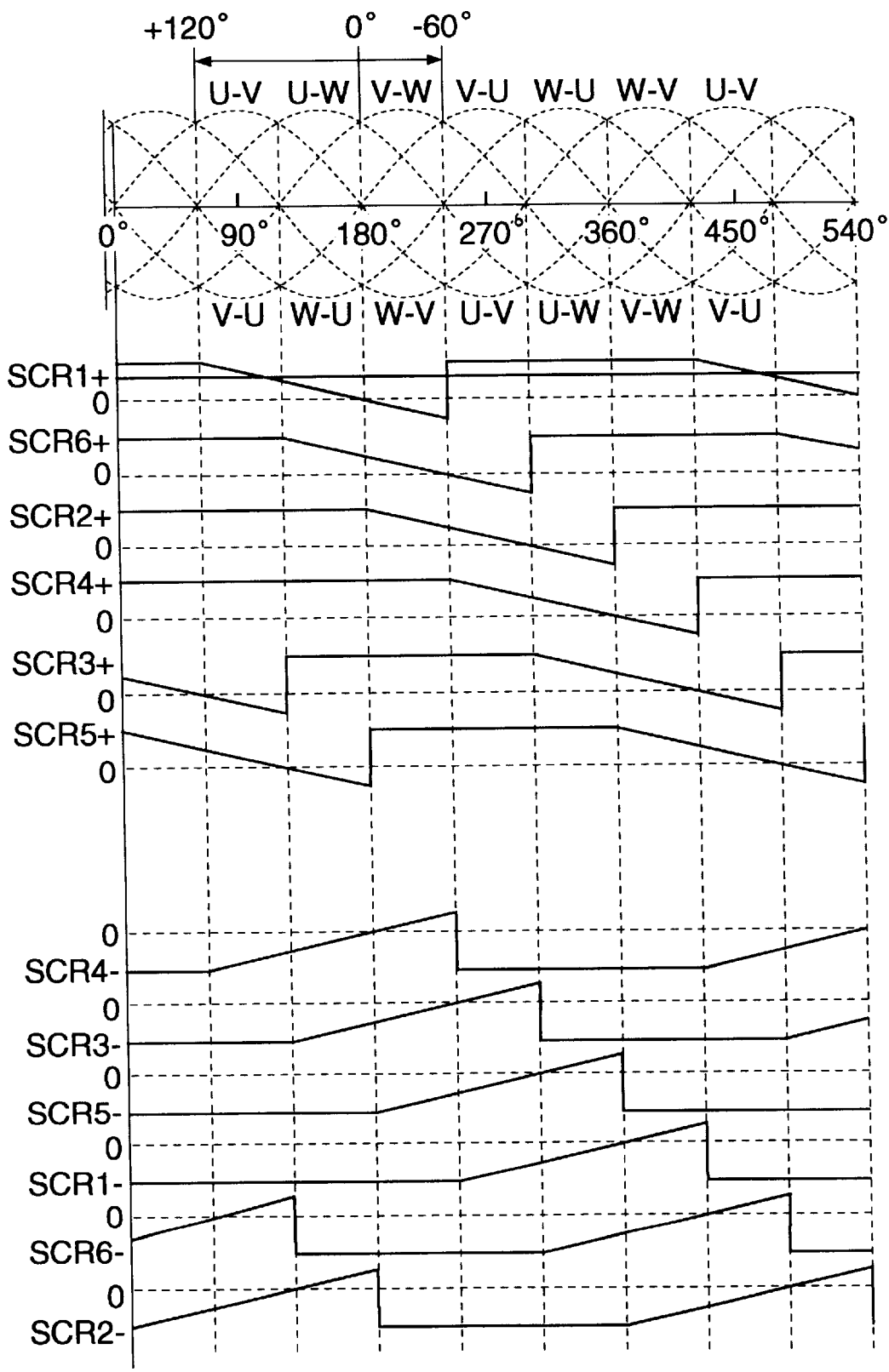
FIG. 7 is a diagram showing reference sawtooth waves generated for controlling the firing angles of the thyristors.

FIG. 7 shows reference sawtooth waves generated for controlling the firing angle α of the thyristors of the cycloconverter. The reference sawtooth waves shown in the figure are generated based on respective electric currents detected by i.e. taken out from the secondary photosensors of the photocouplers PCk shown in FIG. 4.

A reference sawtooth wave for control of the thyristor SCR1+ of the positive converter BC1, for instance, is one which changes in voltage within a phase angle range of 120° to −60° and assumes 0 V at a phase angle of 0°. Reference sawtooth waves each having a phase difference of 60° from adjacent ones sequentially correspond to the thyristors SCRk+, i.e. SCR1+, SCR6+, SCR2+, SCR4+, SCR3+, and SCR5+, respectively.

On the other hand, a reference sawtooth wave for control of the thyristor SCR1− of the negative converter BC2, for instance, is one which is symmetrical with the sawtooth wave for the thyristor SCR1+ with respect to a horizontal zero voltage line, i.e. which has a phase difference of 180° from the sawtooth wave for the thyristor SCR1+. Similarly to the positive converter BC1, reference sawtooth waves each having a phase difference of 60° from adjacent ones sequentially correspond to the thyristors SCRk−, i.e. SCR1−, SCR6−, SCR2−, SCR4−, SCR3−, and SCR5−, respectively.

Thus, the twelve sawtooth waves provide respective reference waveforms for control of the thyristors SCRk± of the positive and negative converters BC1, BC2. These sawtooth waves are compared with a target waveform r by the use of comparators, not shown, provided in twelve channels, and a point of intersection of each sawtooth wave with the target waveform determines a firing angle of each corresponding thyristor SCRk±.

By employing a sinusoidal wave as the target wave to thereby sinusoidally varying the firing angle α, it is possible to obtain a sinusoidal output wave from the cycloconverter CC.

In FIG. 7, the controllable range of the firing angle is expanded from the range of 120° to 0° shown in FIG. 5 to a range of 120° to −60°. The reason for thus expanding the controllable range of the firing angle is as follows:

In the conventional cycloconverter CC in which the firing angle is controlled within a range of 120° to 0°, if the output voltage the cycloconverter CC is controlled to decrease when a capacitive load is connected to an output terminal thereof and at the same time a positive potential exists on the load side, there occurs a discontinuity in the relationship between the firing angle of each thyristor SCRk± and the output voltage, which can make it impossible to stabilize the output voltage. That is, to decrease the output voltage when a positive potential exists on the load side, it is required to absorb the positive charge on the load side. In the conventional cycloconverter, however, since the firing angle α is controlled within the limited range of 120° to 0°, it is impossible for the positive converter BC1 to absorb the positive charge on the load side, and therefore the negative converter BC2 has to absorb it. When the negative converter BC2 absorbs the positive charge, since the output voltage from the negative converter BC2 can change from the negative full-wave rectified voltage to 0 V as described above, the positive charge on the load side suddenly drops to 0 V, causing a discontinuity in the output voltage. If the controllable range of the firing angle is expanded to 120° to −60°, it is possible to absorb the positive charge by the negative converter BC2 such that a positive output voltage is achieved, so that no discontinuity occurs in the output voltage, thereby making it possible to secure stability of the control.

Figure 8:
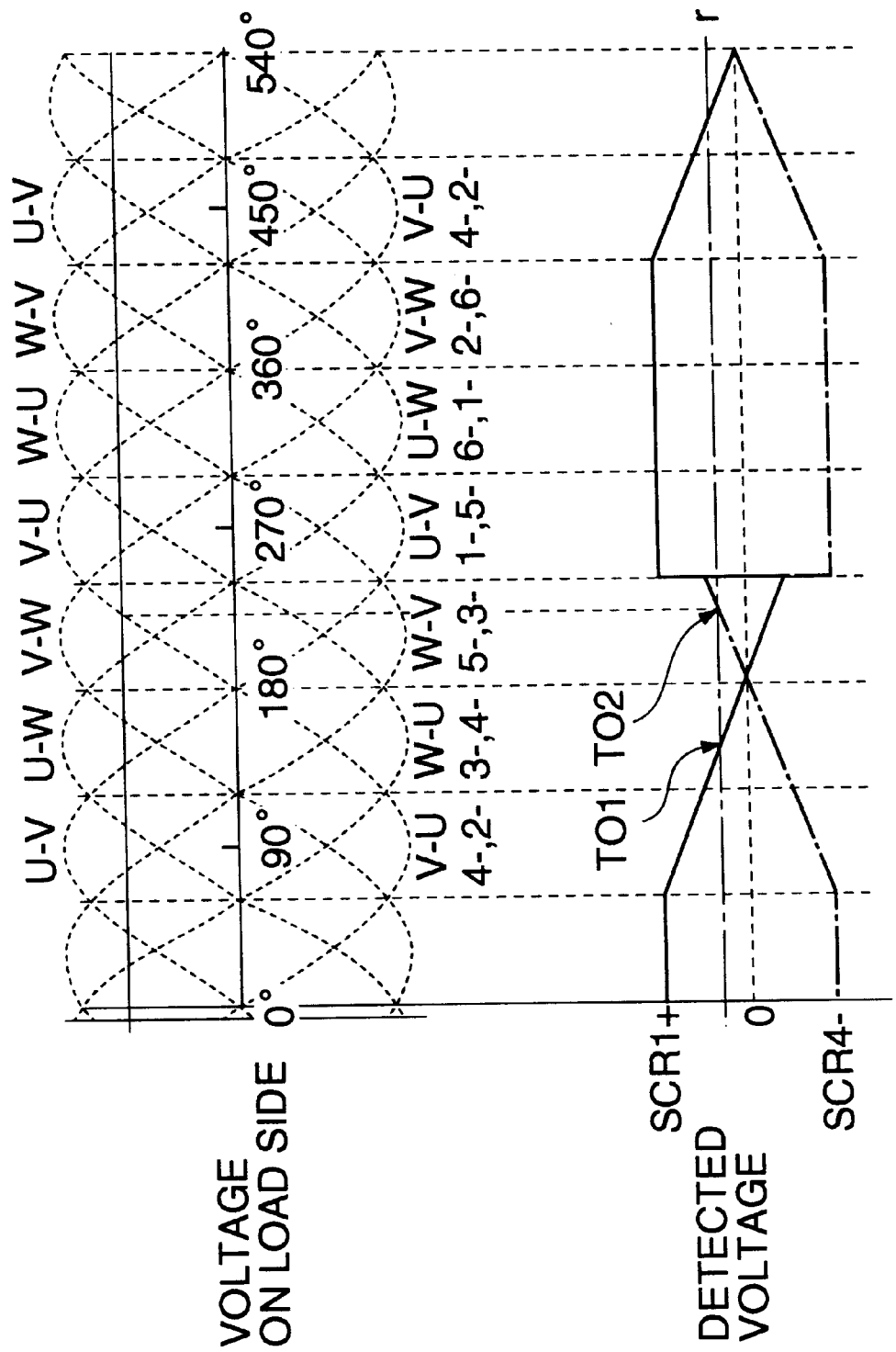
FIG. 8 is a diagram which is useful in explaining a problem to be solved when the firing angle is controlled to a range of 120 degrees to −60 degrees.

However, if the controllable range is thus expanded to the negative side, as shown in FIG. 8, the output ranges of the positive and negative converters BC1, BC2 overlap with each other, so that there exist two intersecting points TO1 and TO2 between the target wave r and each sawtooth wave, and hence it is impossible to judge which of the positive and negative converters BC1 and BC2 should be selected for firing the gate of a corresponding one of the thyristors SCRk± thereof. To solve this problem, in the present embodiment, one of the positive and negative converters BC1 and BC2 is selected according to results of the comparison by the comparator 16, as described above.

Referring again to FIG. 1, the output side of the synchronizing signal-forming circuit 18 is connected to the positive gate control device 15a and the negative gate control device 15b. Connection lines between the synchronizing signal-forming circuit 18 and the positive and negative gate control devices 15a, 15b are each formed by six signal lines which are connected to respective corresponding ones of the six comparators of each of the gate control devices 15a and 15b for supplying them with the respective sawtooth waves having extended sawtooth portions described above with reference to FIG. 7 at timing shown in FIG. 7.

The output sides of the six comparators of the positive control device 15a are connected to the gates of respective corresponding ones of the thyristors SCRk+ of the positive converter BC1, while the output sides of the six comparators of the negative control device 15b are connected to the gates of respective corresponding ones of the thyristors SCRk− of the negative converter BC2.

Although in the present embodiment, the synchronizing signal-forming circuit 18 is constructed such that it forms synchronizing signals (reference sawtooth waves) in response to the three-phase output from the three-phase sub coil 2, this is not limitative, but a single-phase sub coil may be employed in place of the three-phase sub coil 2 to form a synchronizing signal in response to the single-phase output.

Next, the operation of the power unit constructed as above will be described.

As the rotor R is driven for rotation by the engine, voltages are produced between the three-phase output terminals of the three-phase main coil 1 as described above. Then, as the gate of each of the thyristors SCRk± is fired by the firing angle control device 15, the cycloconverter CC delivers electric current, and the filter 3 removes harmonic components from the electric current. The output voltage-detecting circuit 5 detects the voltage of the electric current. The effective voltage value-calculating circuit 8 calculates an effective value of the voltage per repetition period thereof based on the voltage thus detected and generates a signal indicative of the calculated effective value.

The comparator 9 compares the effective value per repetition period with the reference effective voltage value delivered from the reference effective voltage value-generating circuit 10, and the control function-calculating circuit 11 calculates the control function (linear function) based on results of the comparison to deliver the calculated function. More specifically, the control function-calculating circuit 11 calculates the linear function such that a proportional coefficient (constant of proportionality) of the linear function is increased as the difference between the reference effective voltage value from the reference effective voltage value-generating circuit 10 and the effective value per repetition period from the effective voltage value-calculating circuit 8 is larger.

The comparator 20 delivers the difference between the reference sinusoidal wave output from the reference sinusoidal wave-forming circuit 13 and the output voltage detected by the output voltage-detecting circuit 5 to the amplitude control circuit 12.

The amplitude control circuit 12 generates a control signal for controlling the amplitude of the target wave (sinusoidal wave of 50 Hz or 60 Hz) to be delivered from the target wave-forming circuit 14, based on the difference delivered from the comparator 20 and the control function calculated by the control function-calculating circuit 11 as described above, and the target wave-forming circuit 14 forms the target wave based on the control signal and delivers the same to the comparator 21.

The comparator 16 compares the target wave delivered from the target wave-forming circuit 14 with the detected voltage from the output voltage-detecting circuit 5. When the former is higher in voltage than the latter, a high level (H) signal is delivered from the comparator 16 to enable the positive gate control device 15a, whereas when the former is lower in voltage than the latter, a low level (L) signal is delivered from the comparator 16 to enable the negative gate control device 15b.

The comparators of a selected one of the positive gate control device 15a and the negative gate control device 15b each compare the target wave from the target wave-forming circuit 14 with a corresponding sawtooth wave from the synchronizing signal-forming circuit 18, and when the target wave agrees with or intersects the sawtooth wave, a one-shot pulse having a predetermined wavelength is delivered from the gate control device 15 to the gate of a corresponding one of the thyristors SCRk± to control the firing angle thereof.

Figure 9A:
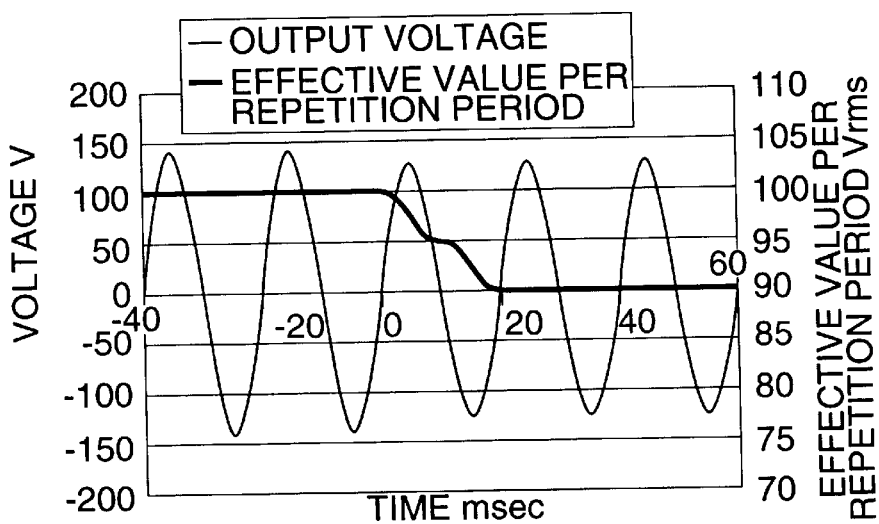
FIGS. 9A to 9C are diagrams useful in explaining grounds of the method employed by the present embodiment for removing fluctuations (pulsation) in the output voltage caused by fluctuations in the engine rotational speed.
Figure 9B:
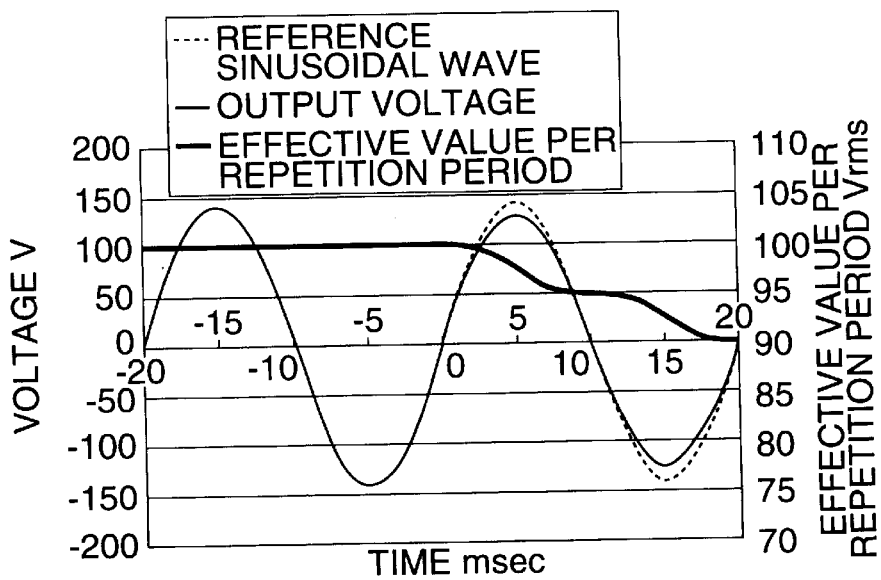
Figure 9C:
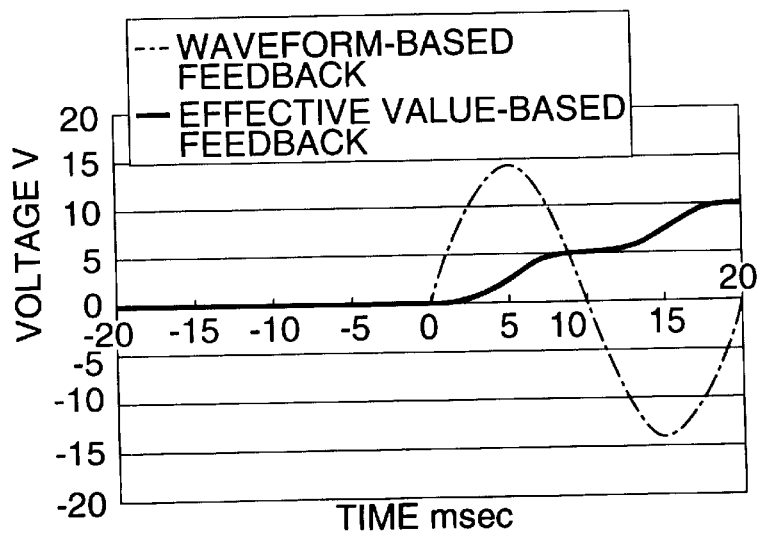

FIGS. 9A to 9D are diagrams which are useful in intuitively understanding the control process carried out by the power unit according to the present embodiment. FIG. 9A shows changes in the effective value per repetition period of the output voltage calculated by the effective voltage value-calculating circuit 8, which occur when the output voltage drops from 100 V to 90 V due to some cause. FIG. 9B shows changes in the FIG. 9A effective voltage value over one repetition period together with changes in the reference sinusoidal wave formed by the reference sinusoidal wave-forming circuit 13. FIG. 9C shows voltage waveforms supplied to the amplitude control circuit 12 when the waveform-based feedback control (carried out mainly by the blocks 5, 13, and 20 in FIG. 1) and the effective value-based feedback control (carried out mainly by the blocks 8 to 11 in FIG. 1) are separately carried out.

As shown in FIG. 9A, when the output voltage drops from 100 V to 90 V at a time point 0, the effective voltage value per repetition period follows up the lowered voltage with a time lag of one repetition period. From this, it can be understand that the effective value-based feedback control is not so effective against fluctuations in the output voltage ascribable to fluctuations in the rotational speed of the engine or a rapid change in the load connected to the power unit (see FIG. 9C as well).

In contrast, as shown in FIG. 9B, the reference sinusoidal wave is free from influence of lowering of the output voltage, so that the waveform-based feedback control can effect feedback of the difference between the reference sinusoidal wave and the output voltage approximately in real time, and hence very effective against fluctuations in the output voltage ascribable to fluctuations in the rotational speed of the engine or a rapid change in the load connected to the power unit.

On the other hand, to apply the waveform-based feedback control for control of even slow fluctuations in the output voltage, a very large feedback gain is required and hence the stability of the output voltage control is degraded. Therefore, the effective value-based feedback control is applied to such slow fluctuations in the output voltage, whereby the feedback gain is suppressed to maintain stability of the control.

As described above, according to the present embodiment, to cope with fluctuations in the output voltage, the effective value-based feedback control and the waveform-based feedback control are used in combination. Therefore, it is possible to carry out more stable feedback control by reducing the feedback gain, and at the same time sufficiently cope with fluctuations in the output voltage occurring in accordance with fluctuations in the input voltage ascribable to fluctuations in the engine rotational speed.

Further, the output frequency of the three-phase generator can be controlled to a predetermined frequency by the cycloconverter CC irrespective of the output frequency of the three-phase generator, that is, the output frequency of the power unit does not depend upon the rotational speed of the drive source, such as an engine, similarly to the inverter generator according to the prior art described above. Therefore, it is possible to obtain a high output from the generator driven by the drive source at a fairly high rotational speed, whereby the generator can be reduced in size and weight.

Furthermore, according to the present embodiment, it is possible to directly convert a high-frequency output of the AC generator to an AC output having a predetermined lower frequency, such as a single-phase commercial frequency. Therefore, the number of power circuit component parts can be largely reduced, which largely contributes to large reduction of the manufacturing cost.

Moreover, when a magneto generator having multiple poles is used as the generator, the voltage delivered to the cycloconverter varies largely depending on whether the power unit is under a no-loaded condition or under a loaded condition. Therefore, the present power unit is capable of effectively controlling fluctuations in the output voltage. However, the use of the magneto generator simplifies the formation of synchronizing signals.

Still further, the rotor R of the generator can be also used as the fly wheel of the engine. This permits the whole power unit to be designed further compact in size.

Although in the above embodiment, an effective voltage value per repetition period is calculated so as to enable the power unit to cope with fluctuations in the output voltage as quickly as possible, this is not limitative, but if top priority is given to further stable control rather than quick responsivity, an effective voltage value may be calculated over a plurality of repetition periods.

What is claimed is:

1. A power unit comprising:

a three-phase generator having a three-phase output windings;

a pair of variable control bridge circuits connected to said three-phase output windings of said three-phase generator and connected in an antiparallel manner to each other to form a cycloconverter for generating a single-phase alternating current to be supplied to a load;

voltage-detecting means for detecting a voltage of said single-phase alternating current generated by said pair of variable control bridge circuits;

effective voltage value-detecting means for detecting an effective value of said voltage of said single-phase alternating current;

reference waveform voltage-generating means for generating a voltage having a reference waveform for controlling said single-phase alternating current;

reference effective voltage-generating means for generating a reference effective voltage for controlling said single-phase alternating current; and control means for controlling said pair of variable control bridge circuits such that said pair of variable control bridge circuits alternately switch to operate every half a repetition period of said single-phase alternating current, so as to make said effective value of said voltage of said single-phase alternating current detected by said effective voltage value-detecting means closer to a value of said reference effective voltage generated by said reference effective voltage-generating means, and at the same time, make said voltage of said single-phase alternating current detected by said voltage-detecting means closer to said voltage having said reference waveform, which is generated by said reference waveform voltage-generating means.

2. A power unit according to claim 1, wherein said effective voltage value-detecting means detects said effective value over a predetermined number of repetition periods of said voltage of said single-phase alternating current.

3. A power unit according to claim 2, wherein said predetermined number of repetition periods of said voltage of said single-phase alternating current is one repetition period.

4. A power unit according to claim 1, wherein said three-phase generator is a magneto generator having a permanent magnet rotor.

5. A power unit according to claim 2, wherein said three-phase generator is a magneto generator having a permanent magnet rotor.

* * * * *